June 26, 1962  M. LUCCI  3,041,590
COMBUSTIBLE FUME DETECTOR

Filed Dec. 23, 1958　　2 Sheets-Sheet 1

INVENTOR.
MARIO LUCCI
BY Paul & Paul
ATTORNEYS

June 26, 1962 M. LUCCI 3,041,590
COMBUSTIBLE FUME DETECTOR
Filed Dec. 23, 1958 2 Sheets-Sheet 2

INVENTOR.
MARIO LUCCI
BY Paul & Paul
ATTORNEYS

United States Patent Office 3,041,590
Patented June 26, 1962

3,041,590
COMBUSTIBLE FUME DETECTOR
Mario Lucci, Casey Key, Nokomis, Fla.
Filed Dec. 23, 1958, Ser. No. 782,576
7 Claims. (Cl. 340—237)

This invention relates to improvements in a fume detector, and more particularly concerns such apparatus for detecting explosive fumes in a boat such as is caused by escaping gasoline vapors. The sensing element of such detectors is usually located in the bilge of the boat, and is connected with an alarm device which is located near the wheel of the boat in view of the person steering.

Conventional fume detector apparatus has been of the Wheatstone bridge type. This type of fume detector has presented many problems since it measures differences in electrical resistance and its accuracy is detrimentally influenced by such conditions as corrosion, drafts, and variation in ambient temperature. Additionally, fume detectors of the Wheatstone bridge type require zeroing in order to insure accuracy of the instrument, and such zeroing requires the taking of the sensing unit out of the bilge, zeroing it, and then replacing it back in the bilge. Such fume detectors are also sensitive to resistance changes due to corrosion or oxidation of electrical contacts and junctions.

It is an object of this invention to provide a fume detector which overcomes the foregoing problems and disadvantages.

It is another object of this invention to provide a fume detector which is not affected by corrosion, drafts, and variation in ambient temperature.

It is another object to provide a fume detector which is actuated by radiation and not by electrical resistance.

It is another object to provide a fume detector which does not require zeroing and which detects fumes such as hydrocarbons.

It is another object to provide means for quickly and simply testing the operativeness of the invention.

It is another object of this invention to provide a fume detector which is safe and explosion-proof, and which is not appreciably affected by jars or by deformation of the filament element.

It is another object to provide a fume detector which is simple in construction, economical to manufacture, and easy to maintain.

Other objects and advantages of this invention, as well as the ease with which it may be adapted to existing equipment, will further become apparent hereinafter and in the drawings, in which.

Figure 1:
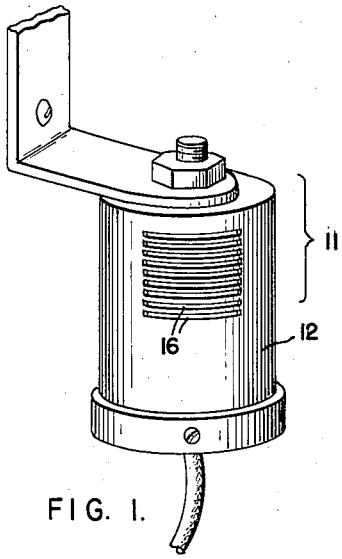
FIG. 1 is a view in perspective of a fume detector constructed in accordance with this invention.
Figure 2:
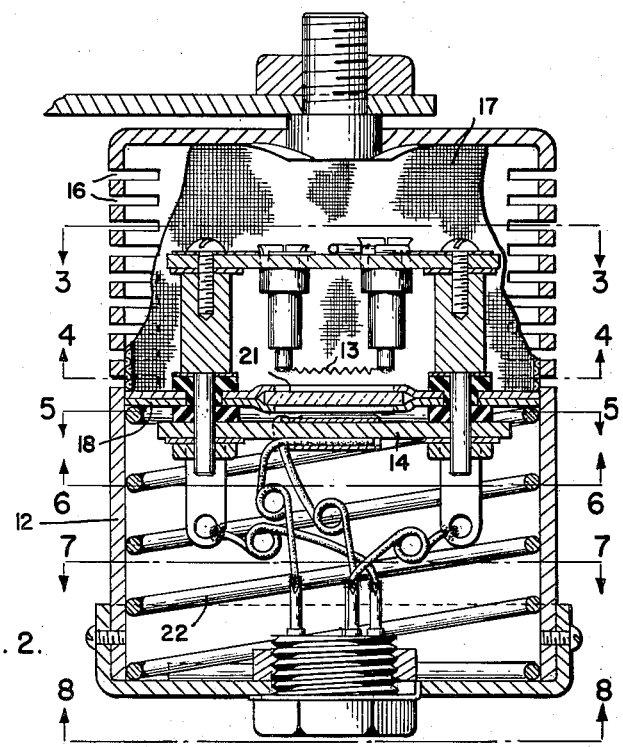
FIG. 2 is a view in cross section on an enlarged scale of the fume detector of FIG. 1 with parts being broken away in order to illustrate important details.
Figure 3:
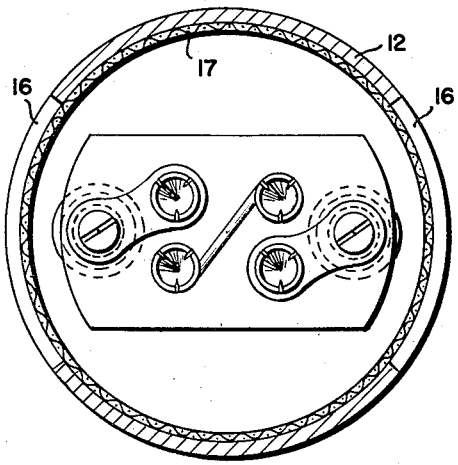
FIG. 3 is a view in section taken as indicated by the lines and arrows 3—3 which appear in FIG. 2.
Figure 4:
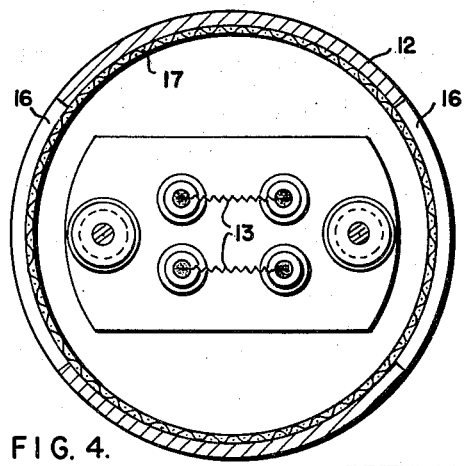
FIG. 4 is a view in section taken as indicated by the lines and arrows 4—4 which appear in FIG. 2.
Figure 5:
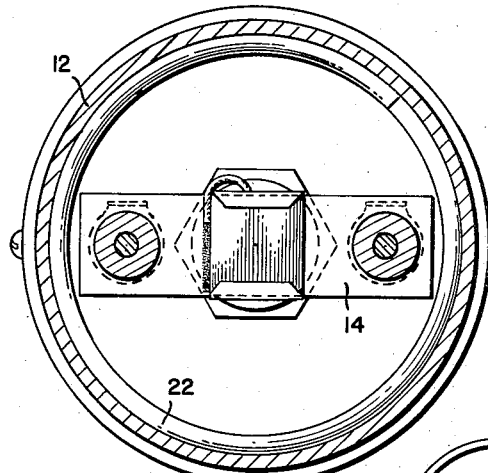
FIG. 5 is a view in section taken as indicated by the lines and arrows 5—5 which appear in FIG. 2.
Figure 6:
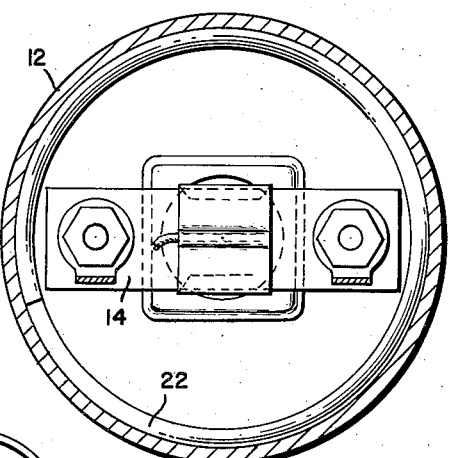
FIG. 6 is a view in section taken as indicated by the lines and arrows 6—6 which appear in FIG. 2.

Although specfiic terms are used in the following description for clarity, these terms are intended to refer only to the structure shown in the drawings and are not intended to define or limit the scope of the invention.

Turning now to the specific embodiment of the invention selected for illustration in the drawings, there is shown a fume detector 11 for detecting the explosive fumes in a boat. Fume detector 11 includes a housing 12, a filament 13 preferably made of platinum and mounted within housing 12, a solar cell 14 for receiving the emission from filament 13, and an alarm circuit 15 (FIG. 10) connected to the solar cell 14 and actuated thereby when emission from filament 13 is greater than a pre-set standard.

Fume detector 11 is also provided with ports 16 formed in housing 12 which admit the fumes to be detected. Screening 17 covers ports 16 and acts as a flame barrier to prevent escape of any explosion or flame which is started upon contact of the fumes with filament 13. Screening 17 is preferably made of multiple layers of Monel screening, 60 mesh, Monel being a high nickel-copper corrosion-resistant alloy produced by International Nickel Company.

Filament 13 is normally continuously energized and caused to glow at a pre-set standard. A ballast tube or other voltage control device may be used to control the voltage from the power source, if desired, to insure the glow of filament 13 at a constant rate, thus eliminating the possibility of a false alarm due to increased voltage.

A diaphragm 18 is positioned between filament 13 and solar cell 14 in order to insulate solar cell 14 from the heat of the filament. Diaphragm 18 is preferably an aluminum disc which supports solar cell 14 and dissipates the heat from the filament 13 to housing 12.

A transparent window 21 is mounted in diaphragm 18, and the purpose of window 21 is to protect solar cell 14 from the heat of filament 13 and to pass the rays emanating from filament 13. Window 21 is preferably made of glass and may be a condensing lens, and it may include a filter if desired. A spacer spring 22 is provided to keep the elements within housing 12 in their proper position.

The bottom of fume detector 11 is provided with quick-disconnect jacks to provide for quick replacement of the entire fume detector 11.

Figure 10:
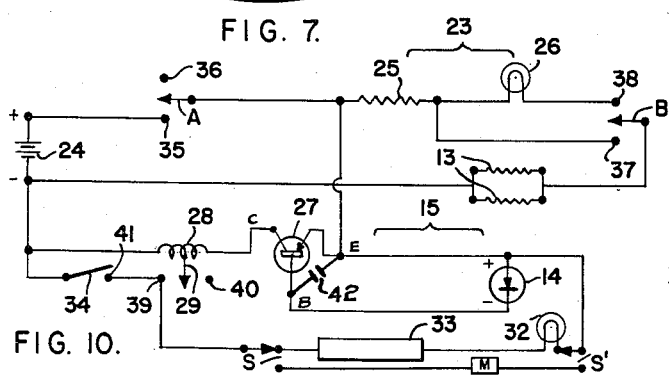
FIG. 10 is a diagrammatic view of the electrical circuit of this invention.

Referring to FIG. 10, there is shown a sensing circuit 23 which includes a battery 24 (preferably a six to twelve volt D.C. battery), on-off switch A, resistor 25, green lamp 26, filament-solar-cell test switch B, and filament 13.

There is also shown in FIG. 10, the alarm circuit 15 which includes battery 24, on-off switch A, solar cell 14, a transistor 27, a relay coil 28 and its armature 29, a red lamp 32, a flasher unit 33, and a red lamp test switch 34.

The switches and relay in the electrical circuit are provided with the contact points 35 through 41, inclusive. A capacitor 42 is positioned in the circuit between the base and the emitter of transistor 27. Capacitor 42 prevents false operation of the alarm circuit 15 due to operation of the ship-to-shore radio.

In operation, a predetermined current is made to flow through filament 13 which causes it to glow very faintly. The glow of the filament 13 is normally sufficient to cause solar cell 14 to generate enough current to operate the alarm circuit 15 and red lamp 32. However, when filament 13 is contacted by the fumes or vapors to be detected, it is caused to glow with an intensity which is proportionate to the degree of fume-air concentration. The glow from the filament 13 immediately increases, and sufficient current is generated in solar cell 14 to actuate the alarm circuit 15 and alert the operator of the boat to the dangerous condition below.

To test the operativeness of fume detector 11, the device is turned on by moving on-off switch A to close with contact 35. Switch B is normally closed with contact 38 so that upon actuation of on-off switch A, current flows through the sensing circuit 23 and causes the filament 13 to glow at the pre-set standard. If green lamp 26 fails to light, there is something wrong with the sensing circuit 23 or the green lamp 26 has burned out.

Next, to test the operativeness of the alarm circuit 15, switch B is moved to make contact with contact 37. This causes filament 13 to glow more brightly, enough to actuate the alarm circuit 15. Actuation of the alarm circuit 15 causes current to flow to solar cell 14, and this current is boosted by the transistor 27 to energize relay coil 28 to cause its armature 29 to make contact with contact point 39 and actuate red lamp 32 and flasher unit 33. This is the same operation as when in normal operation, the filament 13 detects the presence of fumes.

To test the operativeness of red lamp 32 and flasher unit 33, the red lamp test switch 34 is closed to put those elements across the battery 24 and light them.

Figure 9:
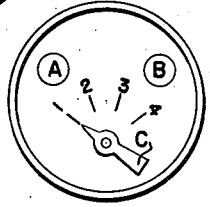
FIG. 9 is a view of the switch mechanism.
Figure 7:
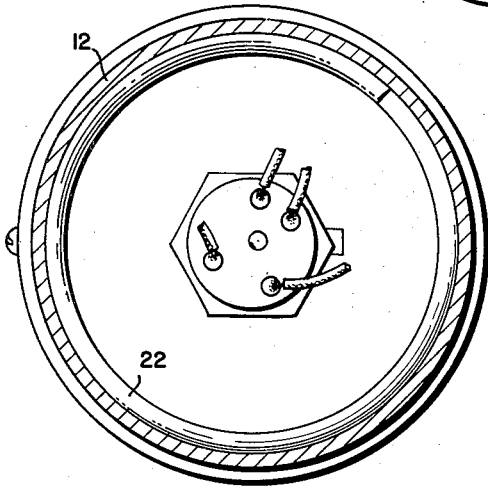
FIG. 7 is a view in section taken as indicated by the lines and arrows 7—7 which appear in FIG. 2.
Figure 8:
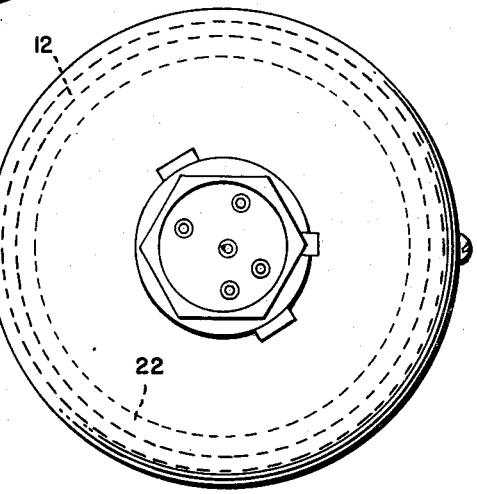
FIG. 8 is an end view taken as indicated by the lines and arrows 8—8 which appear in FIG. 2.

The switches shown in FIG. 10 appear as a multiple switch in front of the operator as is shown in FIG. 9. The button marked A is the on-off button, the button marked B is the filament-solar-cell test switch B, and the handle marked C is part of an on-off and selector switch. When handle C is in position 1, the apparatus is off, and when in position 2, the apparatus is on and corresponds to switch A making contact with contact point 35. To test the red lamp 32 and the flasher unit 33, the handle C is moved to position 3 which corresponds to closing the red lamp test switch 34. To test the operativeness of sensing circuit 23, the handle C is moved to position 4 which corresponds to switch B making contact with contact point 37.

It is to be noted that a meter indicator M may be inserted as by the switches S and S' in place of or in conjunction with red lamp 32 and flasher unit 33 and used as an alarm indicator if desired. Such a meter, suitably calibrated in addition to acting as an alarm indicator, may also be used to determine the degree of concentration of the fumes so that the unit becomes a combustible gas detector and analysis apparatus.

Highly satisfactory results have been obtained in using a solar cell 14 which is of the silicon type comprising p-type and n-type silicon material and having a p-n junction therebetween. The term p-n junction defines the boundary layer between p-type and n-type semi-conducting material. A silicon solar cell has the property of generating current in response to light energy or photons received. The light energy or photons received and absorbed near the p-n junction, if sufficient in strength, break a crystal valence bond in the dipole layer and thus free electrical charge carriers, i.e. holes and electrons. The holes and electrons separate, the holes flowing into the p-type material, the electrons flowing into the n-type material. This separation of charges causes a voltage to appear across the junction, and a current to flow through the circuit which is connected to the solar cell. It is known that silicon solar cells function as generators of electrical voltage, and hence current, in response not only to light energy in the visible spectrum (4000–7000 angstroms) but also to energy in the infra-red spectrum (7000–11,000 angstroms). As a matter of fact, known forms of silicon solar cells have a peak response in the neighborhood of 8000–8500 angstroms, which is in the infra-red range.

Fume detector 11 measures the radiation emitted from filament 13 and does not measure electrical resistance, thereby eliminating all of the difficulties heretofore encountered with such systems which utilize electrical resistance.

In fume detector 11, the operativeness of the system is quickly and easily tested and determined as hereinbefore described.

Sudden jars or deformation of filament 13 have no appreciable effect on its operation, since changes in the electrical resistance are of no importance. This is not the case in a conventional bridge circuit fume detector where a deformation of the filament causes it to glow with more or less intensity and results in a change in electrical resistance.

Fume detector 11 has proven to be extremely safe, the flame barrier provided by screening 17 operating so as not to pass a four to one mixture of hydrogen and air.

It is to be understood that the form of the invention herewith shown and described is to be taken as a preferred embodiment. Various changes may be made in the shape, size, and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims. Additionally, this invention is not limited to boat use and may be used in factories, homes, garages, and the like.

It is to be understood that the term "light energy" as used in the appended claims includes not only the energy of light waves in the visible spectrum but also the energy of waves in the infra-red region.

Having thus described my invention, I claim:

1. A vapor detector comprising: a filament adapted when hot to function as a catalyst for ignitable vapors to be detected; means for passing current through said filament to heat said filament to a low intensity; a photovoltaic current generator responsive to light energy received in both the visible and infra-red spectrums for generating current in an amount corresponding to the amount of such light energy received; means supporting said generator in position to receive such light energy from said filament; and indicating means responsive to an increase in said generated current for indicating the presence and degree of concentration of ignitable vapors in the vicinity of said filament.

2. A vapor detector as claimed in claim 1 characterized in that said filament is platinum.

3. A vapor detector as claimed in claim 2 further characterized in that said light-responsive current generator is a silicon solar cell.

4. A vapor detector as claimed in claim 3 further characterized in that said indicating means includes an alarm circuit.

5. A fume detector comprising: a platinum filamentary wire adapted when hot to function as a catalyst in the presence of ignitable fumes to be detected; means for passing current through said wire in a controlled amount to heat said wire sufficiently to cause said wire to glow with a predetermined small intensity in the presence solely of air; a silicon solar cell for generating current in response to light energy received in both the visible and infra-red spectrums; means for supporting said current generator in a position to receive such light energy from said filamentary wire; and indicating means actuable by an increased current generated by said current-generating means for indicating the presence of ignitable fumes, the arrangement being such that the current generated in response to light energy received from said wire when said wire glows with said predetermined small intensity is insufficient to actuate said indicating means but the increased current generated in response to the increased light energy received from said wire, due to said wire glowing more intensely in the presence of said ignitable fumes, is sufficient to actuate said indicating means.

6. A fume detector as claimed in claim 5 further characterized in that said indicating means includes an alarm circuit.

7. A fume detector as claimed in claim 5 further characterized in that said indicating means includes a meter adapted to indicate the degree of concentration of said ignitable vapors.

References Cited in the file of this patent
UNITED STATES PATENTS 892,241     Freise _____ June 30, 1908

(Other references on following page)

UNITED STATES PATENTS

| | | | |
|---|---|---|---|
| 1,256,740 | Steiger | Feb. 19, | 1918 |
| 1,421,720 | Roberts | July 4, | 1922 |
| 2,299,815 | Gent | Oct. 27, | 1942 |
| 2,304,641 | Jones | Dec. 8, | 1942 |
| 2,577,973 | MacDougall et al. | Dec. 11, | 1951 |
| 2,627,064 | Allen | Jan. 27, | 1953 |
| 2,781,506 | Harrison | Feb. 12, | 1957 |
| 2,787,782 | Rosenblum et al. | Apr. 2, | 1957 |
| 2,897,485 | Johnson | July 28, | 1959 |

FOREIGN PATENTS

| | | | |
|---|---|---|---|
| 265,391 | Germany | Oct. 6, | 1913 |
| 521,098 | Great Britain | May 13, | 1940 |

UNITED STATES PATENT OFFICE
CERTIFICATE OF CORRECTION

Patent No. 3,041,590            June 26, 1962

Mario Lucci

It is hereby certified that error appears in the above numbered patent requiring correction and that the said Letters Patent should read as corrected below.

Column 2, line 59, for "sufficient" read -- insufficient --.

Signed and sealed this 16th day of October 1962.

(SEAL)
Attest:

ERNEST W. SWIDER            DAVID L. LADD
Attesting Officer            Commissioner of Patents